United States Patent
Bousquet

(10) Patent No.: US 6,546,317 B2
(45) Date of Patent: Apr. 8, 2003

(54) PROCESS AND DEVICE FOR CONTROLLING AT LEAST ONE AERODYNAMIC ELEVATOR SURFACE OF AN AIRCRAFT DURING A TAKEOFF

(75) Inventor: Guy Bousquet, Colomiers (FR)

(73) Assignee: Airbus France, Toulouse (FR)

( * ) Notice: Subject to any disclaimer, the term of this patent is extended or adjusted under 35 U.S.C. 154(b) by 0 days.

(21) Appl. No.: 10/156,231

(22) Filed: May 29, 2002

(65) Prior Publication Data

US 2003/0004621 A1 Jan. 2, 2003

(30) Foreign Application Priority Data

Jun. 25, 2001 (FR) .............................. 01 08328

(51) Int. Cl.$^7$ ................................. G06G 7/70
(52) U.S. Cl. ........................ 701/15; 244/175; 318/584
(58) Field of Search .............................. 701/15, 4, 7, 5, 701/6, 8, 16; 244/175–178, 179–182; 318/584, 648

(56) References Cited

U.S. PATENT DOCUMENTS 4,829,220 A  5/1989  Fabre
5,047,942 A  9/1991  Middleton et al.
5,826,833 A  * 10/1998 Evans et al. .................. 701/15

FOREIGN PATENT DOCUMENTS

FR  2711257  4/1995

* cited by examiner

*Primary Examiner*—Richard M. Camby
(74) *Attorney, Agent, or Firm*—Stevens, Davis, Miller & Mosher, LLP

(57) ABSTRACT

Process and device for controlling at least one aerodynamic elevator surface of an aircraft during a takeoff.

The device (1) comprises a control member (3), calculation means (5) and motor means (7) for controlling the aerodynamic elevator surface (2), as a function of an attitude angle control law received from the calculation means (5). If the duration T between the moment at which the pilot actuates the control member (3) so as to control the aerodynamic elevator surface (2) in such a way as to increase the pitch attitude angle of the aircraft and the moment at which the aircraft should reach the minimum takeoff speed is less than or equal to a nominal duration, the calculation means (5) determine and transmit a minimum control law. Otherwise, they determine and transmit a modified control law which is such that at a duration T after the actuation of the control member (3), the pitch attitude angle is substantially equal to a nominal value.

10 Claims, 3 Drawing Sheets

PROCESS AND DEVICE FOR CONTROLLING AT LEAST ONE AERODYNAMIC ELEVATOR SURFACE OF AN AIRCRAFT DURING A TAKEOFF

BACKGROUND OF THE INVENTION

The present invention relates to a device and a process for controlling at least one aerodynamic elevator surface of an aircraft, during a takeoff phase.

It is known that, to achieve aircraft takeoff, the pilot accelerates this aircraft over the runway, until it reaches a speed Vr (at a time tr) at which he actuates a control member of the aircraft, for example a ministick. This actuation brings about the movement of the aerodynamic elevator surfaces, of the elevators type, this having the effect of raising the nose of the aircraft, the nose gear of which lifts off the ground, the aircraft continuing to run over the runway by means of its main gear. The aircraft is then still in the acceleration phase, its longitudinal axis being inclined by a pitch attitude angle θ with respect to the runway. When the aircraft reaches a speed Vlof, at a duration T after the actuation of the control member, the wheels of the main gear leave the runway in turn and takeoff is achieved.

However, before takeoff is achieved, while the aircraft is running on the runway, there is a risk of the aircraft touching said runway with the rear part of its fuselage if the pitch attitude angle exhibits too high a value.

Generally, the change in the attitude angle θ between the times tr and tr+T satisfies a particular control law, according to which said attitude angle θ increases as a function of time.

Consequently, if the pilot actuates the control member at a low speed Vr, the time T required to reach the speed Vlof is large so that, the attitude angle θ increasing as a function of time, it is possible to reach a value of attitude angle θ which is very high at the time tr+T, and which may be such that the rear part of the fuselage touches the ground.

Moreover, to reduce the takeoff distance, the pilot may be obliged to take off with minimum speeds Vr and Vlof, this requiring the nose of the aircraft to be raised further thereby increasing the attitude angle. Of course this heightens the risk of touching the ground with the rear part of the fuselage.

This risk is all the greater the longer the aircraft and hence the bigger the distance L between its main gear and said rear part of the fuselage. Specifically, for a given height of gear, the critical angle θq for which the rear part of the aircraft touches the ground decreases as the distance L increases. For example, on an aircraft of the "Airbus A340" type, the critical angle θq is of the order of from 13.5° to 14°, the value of θ during takeoff with a minimum speed Vr being of the order of from 12° to 12.5° depending on the configuration of the aircraft. As a result of this, the margin of the attitude angle θ at takeoff is of the order of only 1.5°. The risk of touching the ground with the rear part of the fuselage and hence of damaging the aircraft must consequently be taken into consideration.

DESCRIPTION OF THE PRIOR ART

Patent FR-2 711 257 discloses a control system for elevators of an aircraft comprising means making it possible to attenuate the control signal of said elevators, as a function of the attitude angle θ of the aircraft. The attenuation increases, up to a specified threshold, as the angle θ increases. By attenuating the increase in θ as a function of time, such a system reduces the risk of touching the ground with the rear part of the fuselage.

However, this risk is not completely eradicated. Specifically, despite this attenuation, for a very large time T, the attitude angle θ may reach the aforesaid critical value θq. Moreover, this known system has the drawback of attenuating the rate of rotation (or variation of attitude as a function of time) in all cases, even when the speed Vr is high enough for there to be no risk of touching the ground with the rear part of the fuselage. In this case, this known system needlessly lengthens the time required to reach the value of the attitude angle θ allowing takeoff to be achieved, this obviously having the effect of increasing the distance required for takeoff.

SUMMARY OF THE INVENTION

The present invention relates to a process for controlling at least one aerodynamic elevator surface of an aircraft, during a takeoff phase, which makes it possible to remedy the aforesaid drawbacks.

To this end, said process is noteworthy, according to the invention, in that, during the acceleration of the aircraft running along the ground with a view to takeoff, as soon as a pilot actuates a control member for controlling said aerodynamic elevator surface in such a way as to increase the pitch attitude angle of the aircraft with respect to the ground, at a ground running speed Vr:

a) a speed Vlof min is determined at which the last wheels of the aircraft leave the ground in the case of a takeoff for which the pitch attitude angle is controlled according to a nominal control law and exhibits at this speed Vlof min a nominal value θnom which is below, by a predefined margin, a critical value θq of pitch attitude angle, for which the aircraft touches the ground at the rear with a part of its fuselage;

b) the duration T required for the aircraft to go from the speed Vr to this speed Vlof min is determined;

c) this duration T is compared with a nominal duration Tnom which corresponds to the duration required for the aircraft to go, according to a nominal control law, from a pitch attitude of running θr (at the speed Vr) to said pitch attitude of nominal value θnom; and d) from this comparison is deduced a control law for the pitch attitude angle, which is applied to the aircraft and which corresponds:

if the duration T is less than or equal to the nominal duration Tnom, to said nominal control law; and if the duration T is greater than the nominal duration Tnom, to a modified control law which is such that at a duration T after the actuation of the control member by the pilot, the pitch attitude angle of the aircraft is substantially equal to said nominal value.

Thus, by virtue of the invention, when there is a risk of the fuselage of the aircraft touching the ground when the aerodynamic elevator surface is controlled by a nominal (theoretical) control law, a modified law which prevents such contact is applied to said aerodynamic surface.

Consequently, there is no longer any risk of contact, this of course being a considerable advantage in respect of safety.

Moreover, unlike the solution proposed by the aforesaid patent FR-2 711 257, the nominal control law is modified only when actually necessary for safety. In the converse case, the aircraft is still controlled according to the nominal control law which has the advantage (as will be seen hereinbelow) of representing the actuation of the control member by the pilot more faithfully.

Preferably, said modified control law substantially follows the nominal control law for a duration of 3T/4 starting from the actuation of the control member by the pilot, then deviates from this nominal control law so that at the duration T the pitch attitude angle of the aircraft is substantially equal to said nominal value.

Thus, for a major part of the time lying between tr and tr+T, the modified control law remains close to the nominal (theoretical) control law. The advantage of this for the pilot is that he feels, for as long as possible, the effect of his action on the control member.

Additionally, advantageously, the state of at least one parameter of the aircraft which is capable of taking one of at least two states is determined and, for each of the states of said parameter, a different nominal control law and a different modified control law are used. In this case, when the aircraft is fitted with at least two engines, said parameter relates, preferably, to the operation of said engines, one of the states corresponding to normal operation of all the engines and the other state corresponding to a failure of one of said engines.

According to the invention, in the aforesaid step a), the duration T is determined as a function of parameters of the aircraft, of the acceleration of the aircraft at the moment of the actuation of the control member by the pilot, and of the state of the engines of the aircraft. This can be achieved:

by solving the following equation:

$$Vlof\ min - Vr = \int_{tr}^{T} Acc.dt$$

in which:
tr is the moment at which the pilot actuates the control member; and
Acc represents the acceleration of the aircraft; or
from the following simplified expression:

$$T = (Vlof\ min - Vr)/Amoy,$$

Amoy being the average acceleration of the aircraft between the speeds Vr and Vlof min. This average acceleration Amoy is preferably determined by multiplying the acceleration which is measured at the moment at which the pilot actuates the control member, by a predefined coefficient k which is less than 1.

Additionally, advantageously, the speed Vlof min which is used to determine the duration T is determined as a function of the mass of the aircraft, of its configuration, of the state of its engines and of its environment.

The present invention also relates to a device for controlling at least one aerodynamic elevator surface of an aircraft during a take off phase.

According to the invention, said device is of the type comprising:
- a control member, for example a ministick, which is capable of being actuated by a pilot and which is associated with a means (position sensor for example) delivering a signal which is representative of such an actuation;
- calculation means for determining, at least from said signal, a control low; and
- motor means, for example an electric motor or a ram for controlling said aerodynamic elevator surface as a function of a control law received from said calculation means, is noteworthy in that said motor means control said aerodynamic elevator surface at least between the moment of a first actuation of the control member by the pilot so as to control said aerodynamic elevator surface in such a way as to increase the pitch attitude angle of the aircraft with respect to the ground at a ground running speed Vr and the moment at which the last wheels of the aircraft leave the ground at a running speed Vlof, and in that said calculation means comprise:
- means for determining the duration T required for the aircraft to go from the speed Vr to the speed Vlof min;
- means for comparing this duration T with a nominal duration Tnom which corresponds to the duration required for the aircraft to go from a running pitch attitude θr (at the speed Vr) to an attitude of nominal value θnom during a nominal takeoff, for which the pitch attitude angle is controlled according to a nominal theoretical control law, this nominal value θnom being below, by a predefined margin, a critical value θq of pitch attitude angle, for which the aircraft touches the ground at the rear with a part of its fuselage; and
- means for deducing from this comparison the control law for the pitch attitude angle, which is transmitted to the motor means, this control law corresponding:
  - if the duration T is less than or equal to the nominal duration Tnom, to said nominal control law; and
  - if the duration T is greater than the nominal duration Tnom, to a modified control law which is such that at a duration T after the actuation of the control member by the pilot, the pitch attitude angle of the aircraft is substantially equal to said nominal value.

BRIEF DESCRIPTION OF THE DRAWING

The figures of the appended drawing will elucidate the manner in which the invention may be embodied. In these figures, identical references designate similar elements.

DESCRIPTION OF THE PREFERRED EMBODIMENTS

Figure 1:
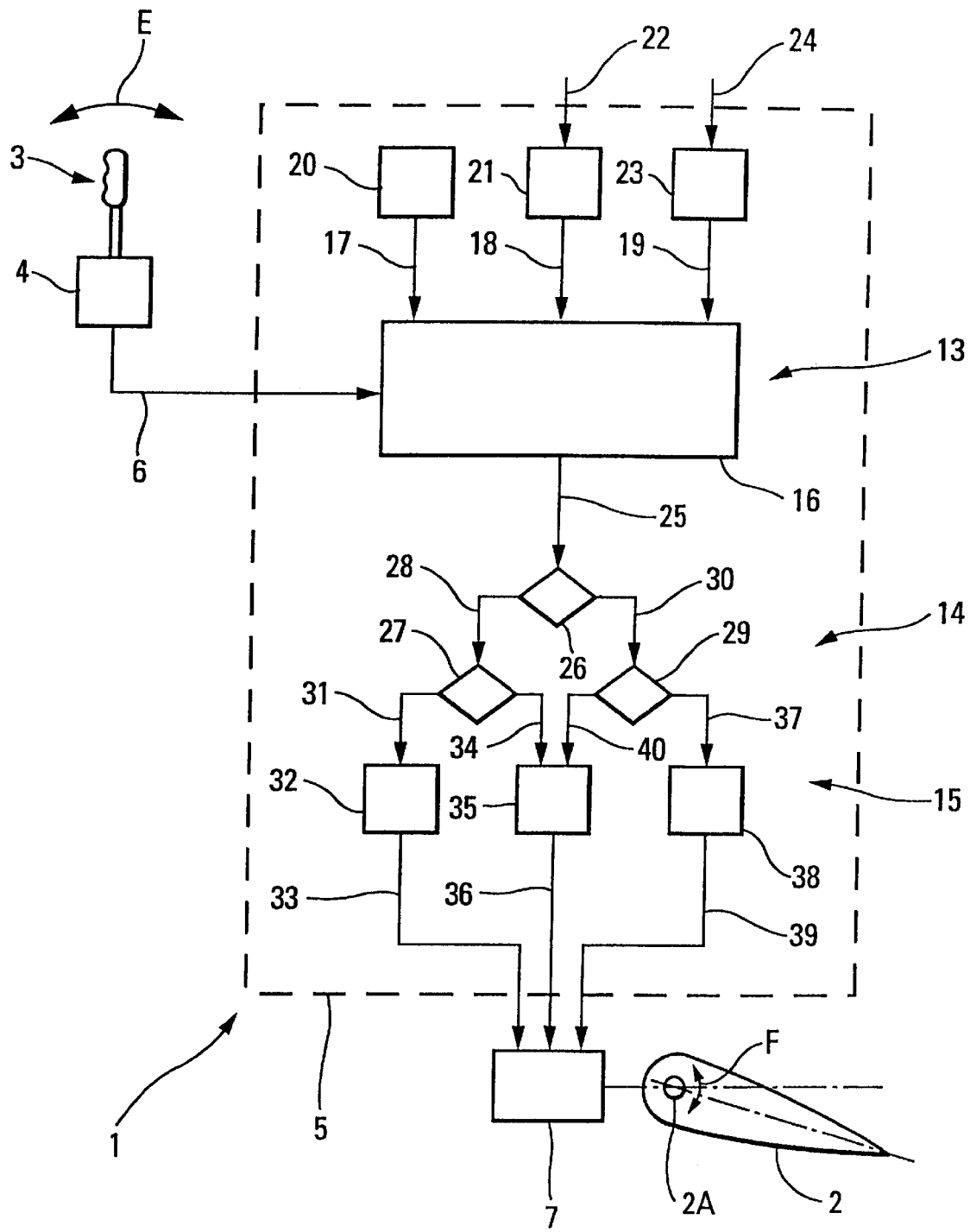
FIG. 1 is the schematic diagram of a device in accordance with the invention.
Figure 2A:
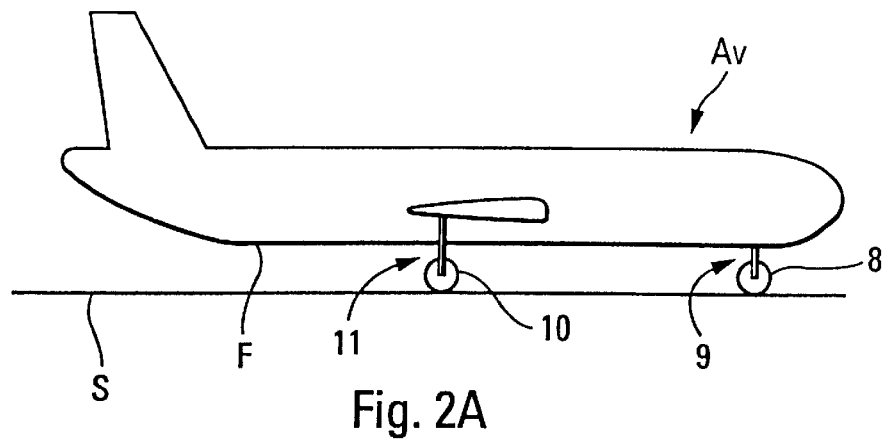
FIGS. 2A to 2C illustrate various positions of an aircraft running along the ground during a takeoff.
Figure 2B:
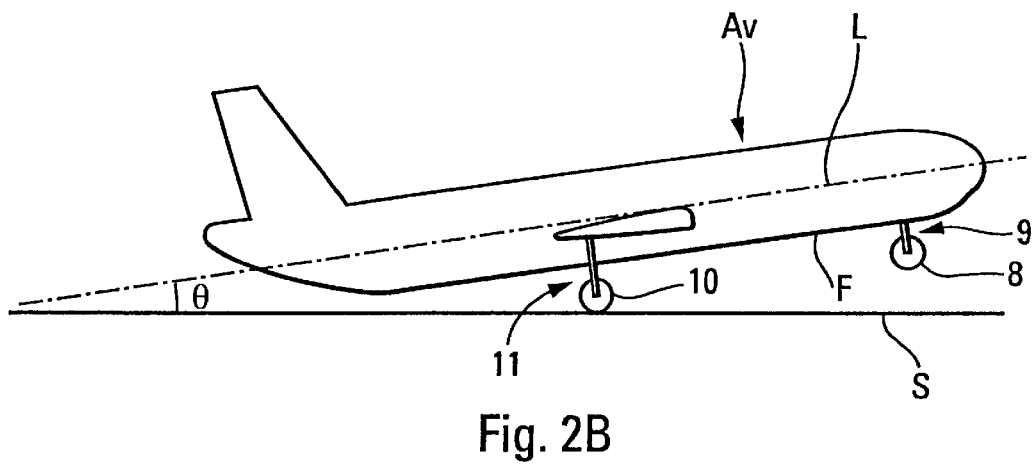
Figure 2C:
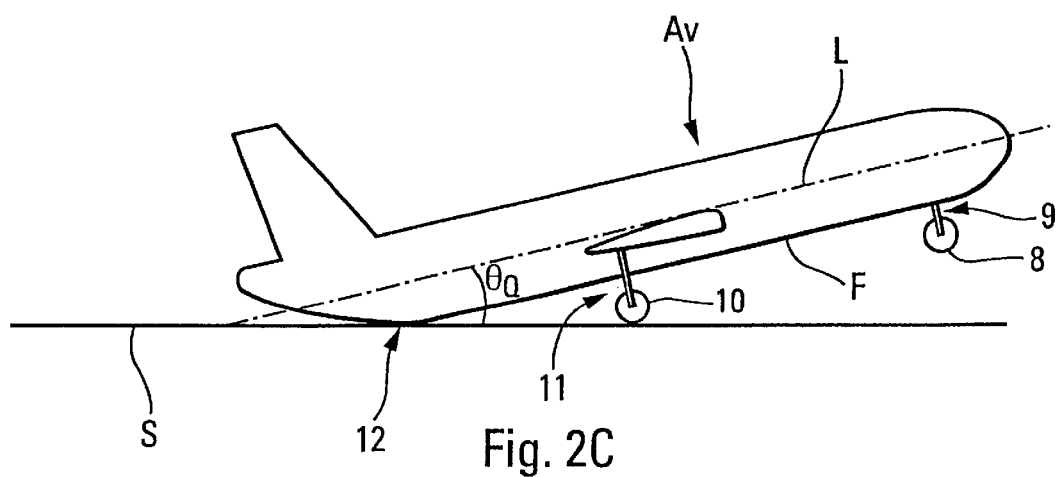

The device 1 in accordance with the invention and represented diagrammatically in FIG. 1 is intended to control one or more aerodynamic surfaces 2 providing for the elevational steering of an aircraft Av, in particular a civil transport aircraft, represented in FIGS. 2A to 2C. This device 1 comprises in a known manner:
- a control member 3 of the ministick type for example, which is capable of being actuated by a pilot as indicated by a double arrow E and which is associated with a standard means 4, for example a position sensor, delivering an electrical signal which is representative of such an actuation;
- calculation means 5 which are connected by a link 6 to the means 4 so as to determine, at least from said electrical signal, a control law; and
- motor means 7 (electric motor or ram for example) for controlling said aerodynamic elevator surface 2 so as to make it pivot about its axis of articulation 2A, as illustrated by a double arrow F, as a function of a control law received from said calculation means 5.

This device 1 is tailored according to the invention so as to avoid the aircraft Av touching the ground S during takeoff.

It is known that the takeoff phase comprises, in particular, the following steps:

a step of acceleration illustrated in FIG. 2A, during which the aircraft Av runs (at a speed V) along the runway, while being accelerated, the wheels 8 of the nose gear 9 and the wheels 10 of the main gear 11 moving over the ground S of the runway;

a step illustrated in FIG. 2B, which begins at a time tr, at which the pilot actuates the control member 3, so as to control said aerodynamic elevator surface 2 in such a way as to increase the pitch attitude angle θ of the aircraft Av which corresponds to the angle between the longitudinal axis L of the aircraft Av and the ground S, this having the effect of raising the nose of the aircraft Av, whose nose gear 9 lifts off the ground, the aircraft Av continuing to run along the runway S by means of its main gear 11. The aircraft Av is then still in the acceleration phase. This actuation takes place at a ground running speed Vr; and a step of actual takeoff, when the aircraft Av reaches a particular speed Vlof, the wheels 10 of the main gear 11 leaving the runway S in turn.

However, before takeoff is achieved, while the aircraft Av is running along the runway S, there is a risk of said aircraft Av touching said runway S with the rear part 12 of its fuselage F if the pitch attitude angle θ or) equal to a critical value θq of pitch attitude angle for which there is contact. This critical value θq is illustrated in FIG. 2C.

The device 1 in accordance with the invention makes it possible to eradicate such a risk and thus to prevent the rear part 12 of the fuselage F of the aircraft Av from touching the ground S on takeoff.

Figure 3:
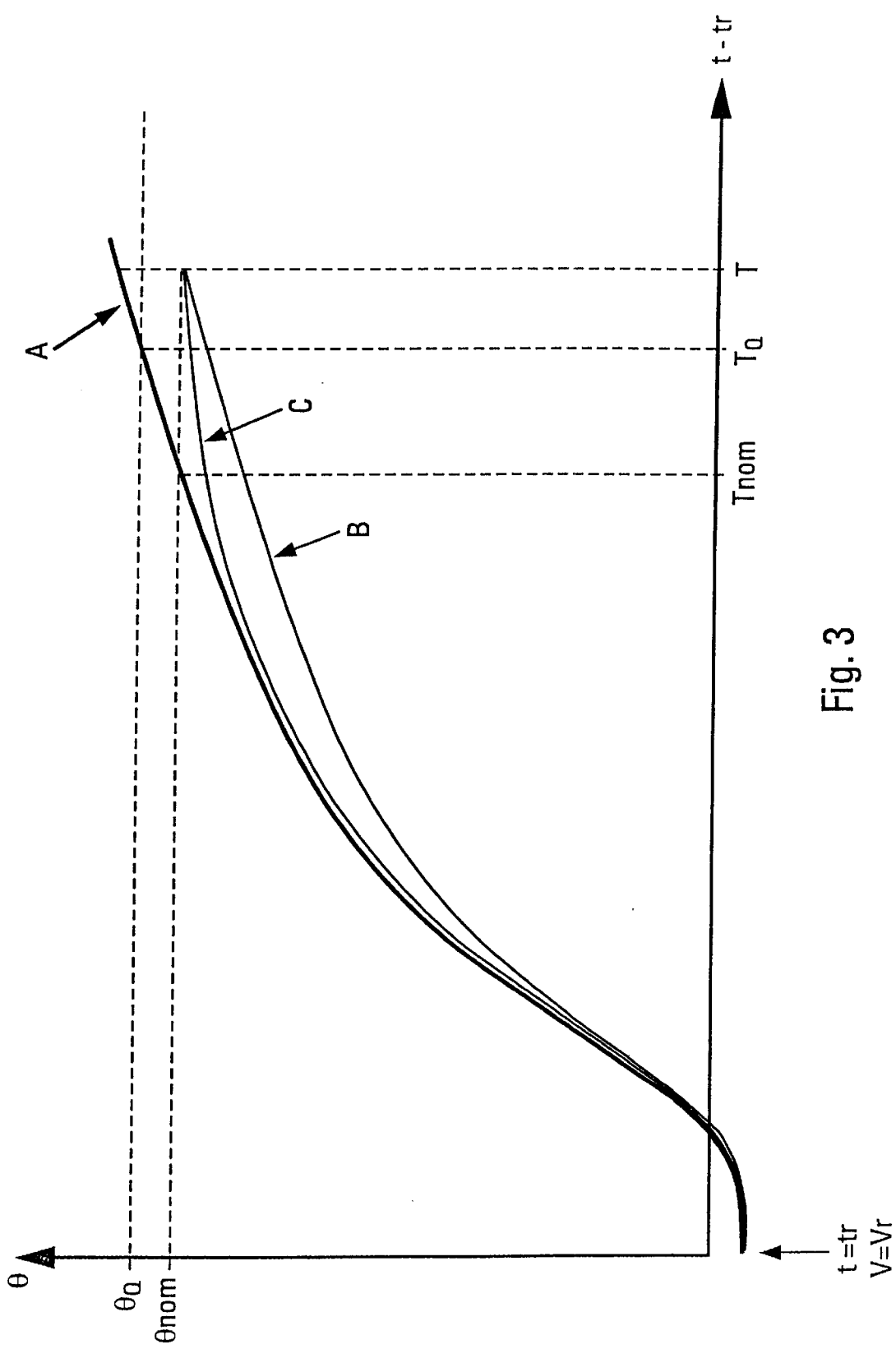
FIG. 3 is a graph illustrating various control laws for the pitch attitude angle and allowing a proper understanding of the action engendered by virtue of the invention.

To do this, according to the invention, said calculation means 5 of the device 1 comprise:

means 13 for determining the duration T required for the aircraft Av to go from the speed Vr to the speed Vlof min;

means (14) for comparing this duration T with a nominal duration Tnom which corresponds to the duration required for the aircraft Av to go from a running pitch attitude θr (not represented explicitly, but close to zero and even slightly less than zero in the example illustrated in FIG. 3) at the speed Vr to an attitude of nominal value θnom during a nominal takeoff, for which the pitch attitude angle θ is controlled according to a nominal theoretical control law, this nominal value θnom being below, by a predefined margin (preferably 20), the critical value θq of pitch attitude angle, for which the aircraft Av touches the ground S at the rear with a part 12 of its fuselage F; and means 15 for deducing from this comparison the control law for the pitch attitude angle θ, which is transmitted to the motor means 7, this control law corresponding:

if the duration T is less than or equal to the nominal duration Tnom, to said nominal theoretical control law; and if the duration T is greater than the nominal duration Tnom, to a modified control law which is such that at a duration T after the actuation (which takes place at t=tr) of the control member 3 by the pilot, hence at an instant t=tr+T, the pitch attitude angle θ of the aircraft Av is substantially equal to said nominal value θnom.

The action carried out by the device 1 in accordance with the invention can be properly understood by referring to the graph of FIG. 3.

In this FIG. 3, the curve A illustrates the nominal control law for the attitude angle θ. According to this nominal control law, the attitude angle θ varies as a function of time t, starting from the moment tr (actuation of the control member 3 by the pilot) at which the angle θ is slightly less than 0, since the aircraft Av is then slightly inclined downwards at the front. Moreover, at the time t=tr+Tnom, the attitude angle θ takes the nominal value θnom, which is, by definition, less than the critical value θq at which the rear part 12 of the fuselage F of the aircraft Av touches the ground, said critical value θq depends on the height of the main gear 11 and the length between said part 12 and said main gear 11 and may easily be determined for each aircraft Av.

According to the invention, if the duration T (duration between the actuation of the control member 3 and the moment at which the aircraft Av leaves the ground S) is less than (or equal to) the duration Tnom, the maximum attitude angle obtained at the time t=tr+T, when the aircraft leaves the ground, is less than (or equal to), the nominal angle θnom. In this case, there is therefore no risk of contact with the ground S. Consequently, the nominal control law A can in this case be used in complete safety.

On the other hand, if the duration T is greater than the duration Tnom, as is represented by way of example in FIG. 3, it is necessary to use a modified control law, such as the law B. Indeed, in the example of FIG. 3, according to law A, at a time t=tr+Tq (that is to say before the time t =tr+T at which the aircraft Av leaves the ground), the attitude angle θ takes the value θq illustrating contact with the ground.

On the other hand, if the modified control law B is used, at the time t=tr+T, the attitude angle takes the nominal value θnom. Take off therefore occurs without risk of contact with the ground S, by using this modified control law B.

Preferably, one still uses the modified control law C which, as may be seen in FIG. 3, substantially follows the nominal control law A for a large duration, for example of the order of 3T/4, starting from the actuation of the control member 3 by the pilot, then one deviates from this nominal control law A so that at the duration T (time t=tr+T), the pitch attitude angle θ of the aircraft Av is substantially equal to said nominal value θnom.

Thus, for a major part of the time lying between t=tr and t=tr+T, the modified control law C remains close to the nominal control law A (theoretical). The advantage of this for the pilot is that it allows him to feel, for as long as possible, the effect of his action on the control member 3.

By way of example, the curve A can correspond to a nominal law such as that used, for example, in patent FR-2 711 257 before attenuation. Curve B is attenuated with respect to curve A, by applying for example a coefficient C0<1 to the latter. The curve C, for its part, can for example be defined as follows:

$$\begin{cases} C(t) = C1 \cdot A(t) \text{ for } t \leq T1 \text{ where } C1 < 1 \text{ and } C1 \approx 1; \text{ and} \\ C(t) = \theta 1 + C2 \cdot [A(t) - A(T1)] \text{ for } t > T1 \text{ where } C2 < C1 < 1 \text{ and } \theta 1 = C(T1) \end{cases}$$

In a particular embodiment, the state of at least one parameter of the aircraft Av which is capable of taking one of at least two states is determined and, for each of said states of said parameter, a different nominal control law and a different modified control law are used. In this case, when the aircraft Av which is fitted with at least two engines (not represented), said parameter relates, preferably, to the operation of said engines, one of the states corresponding to normal operation of all the engines and the other state corresponding to a failure of one of said engines.

Additionally, according to the invention, the speed Vlof min taken into account for the calculation of T is determined according to a standard mode of calculation known to specialists in aeronautics, by taking account of the mass of the aircraft Av, of its configuration (position of the flaps, etc.), of the state of the engines (AEO: "All Engines Operative"/OEI: "One Engine Inoperative") and of its environment (atmospheric conditions, runway, etc.).

Additionally, the duration T can be calculated according to the following method:

for t>tr, we have:

$$V(t)=Vr+\int_{tr}^{T} Acc.dt \quad (1)$$

where V illustrates the speed and Acc is the instantaneous acceleration of the aircraft Av, on takeoff (t=T), we also have: V(T)=Vlof min (2)
from the above two equations (1) and (2) we deduce:

$$V(T)=Vlof\ min=Vr+\int_{tr}^{T} Acc.dt \quad (3)$$

the latter equation (3) can also be written:

$$Vlof\ min-Vr=\int_{tr}^{T} Acc.dt \quad (4)$$

Solving this equation (4) makes it possible to calculate the duration T. To do this, it is of course necessary to know the way in which the acceleration Acc changes from tr to T. This change in the acceleration depends on numerous parameters, known to specialists in aeronautics and available onboard the aircraft Av, such as the thrust of the engines and the position of the control surfaces 2 (these parameters resulting from the application of the control law), the speed Vr, the acceleration Acc(tr), the atmospheric conditions, the mass of the aircraft Av, etc.

In the case where one wishes to simplify the calculation of the duration T, it is possible to calculate an approximate value of the latter by using the following expression:

$$T=(Vlof\ min-Vr)/Amoy \quad (5)$$

where Amoy is the average acceleration over the time interval [tr; tr+T], that is to say when the speed goes from Vr to Vlof min. In practice, this average acceleration Amoy can be estimated by applying a coefficient k<1 to the acceleration Acc(tr) measured at the instant tr for a speed Vr. For example, for a modern civil four-engine airplane of the "Airbus A340" type, the calculations show that an average value of k=0.8 is in practice suitable for the operational conditions. However, the coefficient k can, if necessary, be a variable of a few very influential parameters. This coefficient k makes it possible to take account of the reduction in the acceleration after the instant tr on account of the increase in the aerodynamic drag of the aircraft Av, due to the increase in the latter's pitch attitude θ, and of the change with speed in the thrust of the engines.

It will be noted that if the parameters of the aircraft alter during the takeoff phase between tr and tr+T (for example on account of a fault with an engine), the average acceleration Amoy is recalculated so as to determine a new value of T and to modify the control law if necessary.

For a given type of aircraft, the application of a control law θ(t) makes it possible to calculate the time Tnom corresponding to the attitude angle θnom. Given that two distinct steering laws are generally applied depending on the state of the engines ("AEO"/"OEI"), the two values of Tnom corresponding to these states "AEO" and "OEI" of the engines are therefore calculated a priori (of course, if one is obliged to use other control laws as a function of the values of particular parameters of the aircraft, then as many values of Tnom as there are possible control laws should be calculated). For example, in the case of a civil four-engine airplane, the time Tnom can be equal to around 5 seconds for the AEO configuration and to around 6 seconds for the OEI configuration.

In the preferred embodiment represented in FIG. 1, the calculation means 5 comprise means 16 which determine the duration T, when the pilot actuates the control member 3 (link 6). These means 16 calculate the duration T by using the aforesaid equation (5):

$$T=(Vlof\ min-Vr)/Amoy.$$

To do this, they are connected, respectively by links 17 to 19, to:

standard means 20 for determining, in particular for measuring, the speed Vr;

means 21 for determining in a standard manner the speed Vlof min, from information (mass and configuration of the aircraft Av, state of the engines, etc.) received via a link 22; and means 23 for determining, in a standard manner, the average acceleration Amoy, from information (state of the engines, acceleration at the speed Vr, etc.) received via a link 24.

The duration T determined by the means 16 is transmitted via a link 25 to a means 26 which, as a function of the state of the engines, transmits it:

either to a means of comparison 27 via a link 28, if all the engines are operational ("AEO" configuration);

or to a means of comparison 29 via a link 30, if one of the engines has failed ("OEI" configuration).

The means 27 compares the duration T with the nominal duration Tnom corresponding to the AEO configuration (for example 5 seconds), and:

if T is greater than Tnom, a command is transmitted (link 31) to a means 32 so that it supplies (link 33) a modified control law, for example the law B or the law C, to the motor means 7; and if T is less than or equal to Tnom, a command is transmitted (link 34) to a means 35 so that it supplies (link 36) the nominal control law (law A) to said motor means 7.

Likewise, the means 29 compares the duration T with the nominal duration Tnom for the OEI configuration, which is generally different (for example 6 seconds), and:

if T is greater than Tnom, a command is transmitted (link 37) to a means 38 so that it supplies (link 39) a modified control law to the motor means 7; and otherwise, a command is transmitted (link 40) to the means 35 so as to request the transmission of the nominal control law.

The means 16, 20, 21 and 23 correspond to the aforesaid means 13, the means 26, 27 and 29 correspond to the aforesaid means 14 and the means 32, 35 and 38 correspond to the aforesaid means 15.

What is claimed is:

1. A process for controlling at least one aerodynamic elevator surface of an aircraft, during a takeoff phase, wherein, during the acceleration of the aircraft (Av) running along the ground (S) with a view to takeoff, as soon as a pilot actuates a control member (3) for controlling said aerodynamic elevator surface (2) in such a way as to increase the pitch attitude angle (θ) of the aircraft (Av) with respect to the ground (S), at a ground running speed Vr:
   a) a speed Vlof min is determined at which the last wheels (10) of the aircraft (Av) leave the ground (S) in the case of a takeoff for which the pitch attitude angle (θ) is controlled according to a nominal control law and exhibits at this speed Vlof min a nominal value (θnom) which is below, by a predefined margin, a critical value (θq) of pitch attitude angle, for which the aircraft (Av) touches the ground (S) at the rear with a part (12) of its fuselage (F);
   b) the duration T required for the aircraft (Av) to go from the speed Vr to this speed Vlof min is determined;
   c) this duration T is compared with a nominal duration Tnom which corresponds to the duration required for the aircraft (Av) to go, according to a nominal control law, from a pitch attitude of running at the speed Vr to said pitch attitude of nominal value (θnom); and
   d) from this comparison is deduced a control law (A, B, C) for the pitch attitude angle (θ), which is applied to the aircraft (Av) and which corresponds:
      if the duration T is less than or equal to the nominal duration Tnom, to said nominal control law (A); and
      if the duration T is greater than the nominal duration Tnom, to a modified control law (B, C) which is such that at a duration T after the actuation of the control member (3) by the pilot, the pitch attitude angle (θ) of the aircraft (Av) is substantially equal to said nominal value (θnom).

2. The process as claimed in claim 1, wherein said modified control law (C) substantially follows the nominal control law (A) for a duration of 3T/4 starting from the actuation of the control member (3) by the pilot, then deviates from this nominal control law (A) so that at the duration T the pitch attitude angle (θ) of the aircraft (Av) is substantially equal to said nominal value (θnom).

3. The process as claimed in claim 1, wherein the state of at least one parameter of the aircraft (Av) which is capable of taking one of at least two states is determined and wherein, for each of the states of said parameter, a different nominal control law and a different modified control law are used.

4. The process as claimed in claim 3, wherein, for an aircraft (Av) which is fitted with at least two engines, said parameter relates to the operation of the engines, one of the states corresponding to normal operation of all the engines and the other state corresponding to a failure of one of said engines.

5. The process as claimed in claim 1, wherein in step a), the duration T is determined as a function of parameters of the aircraft (Av), of the acceleration of the aircraft (Av) at the moment of the actuation of the control member (3) by the pilot, and of the state of the engines of the aircraft (Av).

6. The process as claimed in claim 1, wherein in step a), the duration T is determined by solving the following equation:

$$Vlof\ min - Vr = \int_{tr}^{T} Acc\, dt$$

in which:
   tr is the moment at which the pilot actuates the control member (3); and
   Acc represents the acceleration of the aircraft (Av).

7. The process as claimed in claim 1, wherein in step a), the duration T is determined from the following expression:

$$T = (Vlof\ min - Vr)/Amoy,$$

Amoy being the average acceleration of the aircraft (Av) between the speeds Vr and Vlofmin.

8. The process as claimed in claim 7, wherein said average acceleration Amoy is determined by multiplying the acceleration measured at the moment at which the pilot actuates the control member (3), by a predefined coefficient k which is less than 1.

9. The process as claimed in claim 1, wherein the speed Vlofmin which is used to determine the duration T is determined as a function of the mass of the aircraft (Av), of its configuration, of the state of its engines and of its environment.

10. A device for controlling at least one aerodynamic elevator surface (2) of an aircraft (Av) during a take off phase, said device (1) comprising:
   a control member (3) which is capable of being actuated by a pilot and which is associated with a means (4) delivering a signal which is representative of such an actuation;
   calculation means (5) for determining, at least from said signal, a control law (A, B, C); and
   motor means (7) for controlling said aerodynamic elevator surface (2) as a function of a control law (A, B, C) received from said calculation means (5),
wherein said motor means (7) control said aerodynamic elevator surface (2) at least between the moment of a first actuation of the control member (3) by the pilot so as to control said aerodynamic elevator surface (2) in such a way as to increase the pitch attitude angle of the aircraft (Av) with respect to the ground (S) at a ground running speed Vr and the moment at which the last wheels (10) of the aircraft (Av) leave the ground (S) at a running speed Vlof, and wherein said calculation means (5) comprise:
   means (13) for determining the duration T required for the aircraft (Av) to go from the speed Vr to the speed Vlofmin;
   means (14) for comparing this duration T with a nominal duration Tnom which corresponds to the duration required for the aircraft (Av) to go from a running pitch attitude to an attitude of nominal value (θnom) during a nominal takeoff, for which the pitch attitude angle (θ) is controlled according to a nominal control law (A), this nominal value (θnom) being below, by a predefined margin, a critical value (θq) of pitch attitude angle, for which the aircraft (Av) touches the ground (S) at the rear with a part (12) of its fuselage (F); and
   means (15) for deducing from this comparison the control law (A, B, C) for the pitch attitude angle (θ), which is transmitted to the motor means (7), this control law corresponding:
      if the duration T is less than or equal to the nominal duration Tnom, to said nominal control law (A); and
      the duration T is greater than the nominal duration Tnom, to a modified control law (B, C) which is such that at a duration T after the actuation of the control member (3) by the pilot, the pitch attitude angle (θ) of the aircraft (Av) is substantially equal to said nominal value (θnom).

* * * * *

UNITED STATES PATENT AND TRADEMARK OFFICE
CERTIFICATE OF CORRECTION

PATENT NO.    : 6,546,317 B2
DATED         : April 8, 2003
INVENTOR(S)   : Guy Bousquet It is certified that error appears in the above-identified patent and that said Letters Patent is hereby corrected as shown below:

<u>Column 9, lines 2-67 through Column 10, lines 1-65,</u>
Delete claims 1-10 and substitute therefore the new claims 1-10:

1. (Amended) A process for controlling at least one aerodynamic elevator surface of an aircraft, during a takeoff phase, comprising:

(a) accelerating the aircraft along the ground with a view to takeoff;

(b) actuating a control member for controlling said aerodynamic elevator surface to ~~increase a~~ pitch attitude angle of the aircraft with respect to the ground, at a ground running speed Vr;

(c) as soon as said control member is actuated in step (b), determining a speed Vlofmin at which the last wheels of the aircraft leave the ground, in the case of a takeoff whereby the pitch attitude angle is controlled according to a nominal control law and exhibits at the speed Vlofmin a nominal value of the pitch attitude angle which is below, by a predefined margin, a critical value of the pitch attitude angle, for which the aircraft touches the ground at the rear with a part of its fuselage;

(d) determining a duration T required for the aircraft to go from the speed Vr to said speed Vlofmin;

(e) comparing said duration T with a nominal duration Tnom which corresponds to the duration required for the aircraft to go, according to the nominal control law, from a pitch attitude angle used at the speed Vr to said nominal value of the pitch attitude angle; and

UNITED STATES PATENT AND TRADEMARK OFFICE
CERTIFICATE OF CORRECTION

PATENT NO. : 6,546,317 B2
DATED : April 8, 2003
INVENTOR(S) : Guy Bousquet

It is certified that error appears in the above-identified patent and that said Letters Patent is hereby corrected as shown below:

(f) determining from the comparison of step (e) an applied control law for the pitch attitude angle, which is applied to the aircraft and which corresponds:

(1) to the nominal control law, if the duration T is less than or equal to the nominal duration Tnom, and (2) to a modified control law, if the duration T is greater than the nominal duration Tnom, wherein:

the modified control law is such that at the duration T after the actuation of the control member, the pitch attitude angle of the aircraft is substantially equal to said nominal value of the pitch attitude angle.

2. (Amended) The process as claimed in claim 1, wherein said modified control law substantially follows the nominal control law for a duration of 3T/4 starting from the actuation of the control member, then deviates from the nominal control law so that at the duration T the pitch attitude angle of the aircraft is substantially equal to said nominal value of the pitch attitude angle.

3. (Amended) The process as claimed in claim 1, wherein a state of at least one parameter of the aircraft, which is capable of taking one of at least two states, is determined and wherein, for each of the states of said parameter, a different nominal control law and a different modified control law are used.

UNITED STATES PATENT AND TRADEMARK OFFICE
CERTIFICATE OF CORRECTION

PATENT NO. : 6,546,317 B2
DATED : April 8, 2003
INVENTOR(S) : Guy Bousquet

It is certified that error appears in the above-identified patent and that said Letters Patent is hereby corrected as shown below:

4. (Amended) The process as claimed in claim 3, wherein, for an aircraft which is fitted with at least two engines, said parameter relates to an operation of engines of the aircraft, and one of the states corresponds to normal operation of all the engines and the other state corresponds to a failure of one of said engines.

5. (Amended) The process as claimed in claim 1, wherein the duration T is determined as a function of parameters of the aircraft, of an acceleration of the aircraft at the moment of the actuation of the control member, and of a state of engines of the aircraft.

6. (Amended) The process as claimed in claim 1, wherein the duration T is determined by solving the following equation:

$$V_{lofmin} - V_r = \int_{tr}^{T} A_{ac} \cdot dt$$

T = (Vlofmin-Vr)/Amoy, where Amoy is an average acceleration of the aircraft between the speeds Vr and Vlofmin.

8. (Amended) The process as claimed in claim 7, wherein said average acceleration Amoy is determined by multiplying the acceleration measured at the moment the control member is actuated by a predefined coefficient k which is less than 1.

9. (Amended) The process as claimed in claim 1, wherein the speed Vlofmin which is used to determine the duration T is determined as a function of the mass of the aircraft, of a configuration of the aircraft, of a state of engines of the aircraft, and of an environment of the aircraft.

UNITED STATES PATENT AND TRADEMARK OFFICE
CERTIFICATE OF CORRECTION

PATENT NO. : 6,546,317 B2
DATED : April 8, 2003
INVENTOR(S) : Guy Bousquet

It is certified that error appears in the above-identified patent and that said Letters Patent is hereby corrected as shown below:

10. (Amended) A device for controlling at least one aerodynamic elevator surface of an aircraft during a take off phase, said device comprising:

a control member for being actuated by a pilot and which is associated with a means for delivering a signal which is representative of the actuation of the control member;

calculation means for determining, at least from said signal, a control law; and for controlling said aerodynamic elevator surface as a function of the control law received from said calculation means, wherein:

said motor means control said aerodynamic elevator surface at least between the moment of a first actuation of the control member and the moment at which last wheels of the aircraft leave the ground at a running speed Vlof so as to control said aerodynamic elevator surface in such a way as to increase a pitch attitude angle of the aircraft with respect to the ground at a ground running speed Vr, and wherein:

said calculation means comprise:

(a) means for determining a duration T required for the aircraft to go from the speed Vr to a speed Vlofmin;

(b) means for comparing the duration T with a nominal duration Tnom which corresponds to the duration required for the aircraft to go from a running pitch attitude to an attitude of nominal value during a nominal takeoff, for which the pitch attitude angle is controlled according to a nominal control law, the nominal value of the pitch attitude

UNITED STATES PATENT AND TRADEMARK OFFICE
CERTIFICATE OF CORRECTION

PATENT NO. : 6,546,317 B2
DATED : April 8, 2003
INVENTOR(S) : Guy Bousquet

It is certified that error appears in the above-identified patent and that said Letters Patent is hereby corrected as shown below:

angle is below, by a predefined margin, a critical value of the pitch attitude angle, for which the aircraft touches the ground at the rear with a part of its fuselage; and (c) means for determining from this comparison the applied control law for the pitch attitude angle, which is transmitted to the motor means, the applied control law corresponding:

(1) to said nominal control law, if the duration T is less than or equal to the nominal duration Tnom; and (2) to a modified control law, if the duration T is greater than the nominal duration Tnom, whereby at the duration T after the actuation of the control member, the pitch attitude angle of the aircraft controlled by the motor means as the function of the modified control law is substantially equal to said nominal value of the pitch attitude angle.

Signed and Sealed this

Twenty-seventh Day of May, 2003

JAMES E. ROGAN
*Director of the United States Patent and Trademark Office*